March 18, 1930. G. LAMB ET AL 1,751,411
COMMUTATOR TYPE DIRECT CURRENT WATTHOUR METER
Filed May 3, 1929
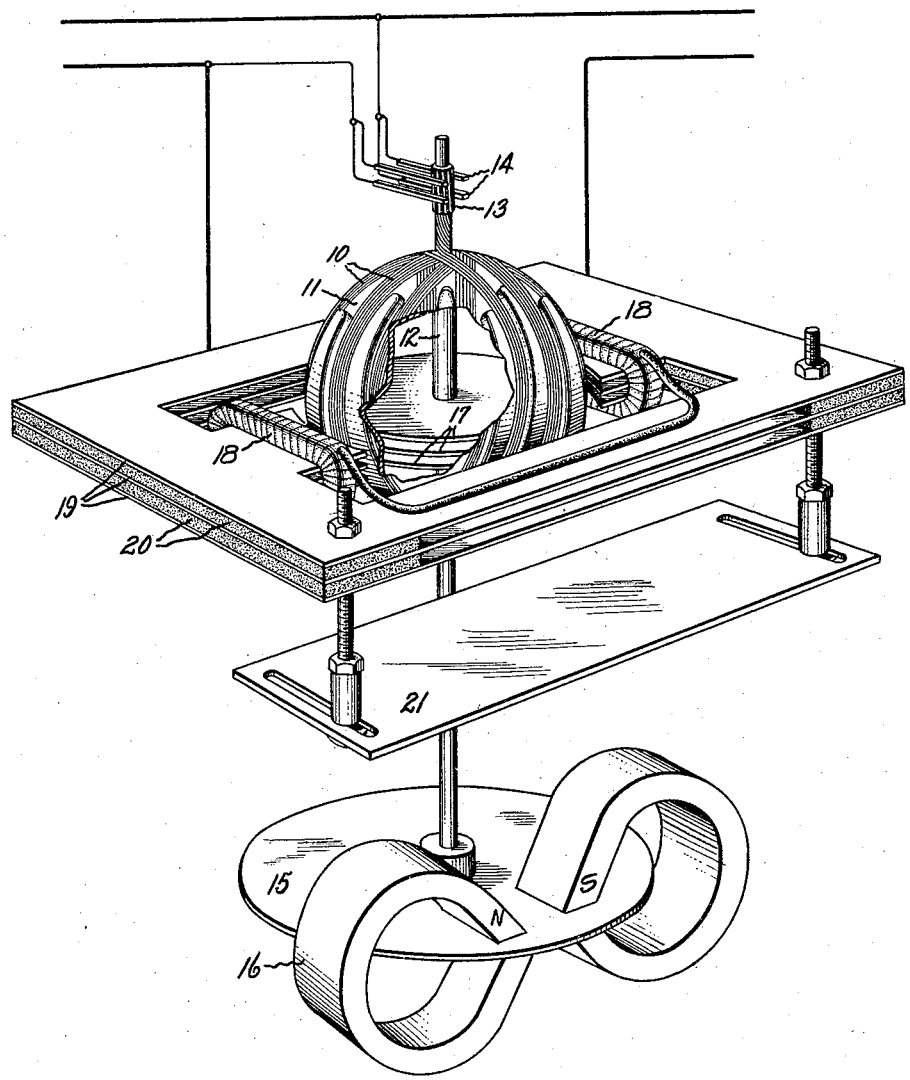
Inventors:
George Lamb,
Isaac F. Kinnard,
by Charles V. Tullar
Their Attorney.

Patented Mar. 18, 1930

1,751,411

UNITED STATES PATENT OFFICE

GEORGE LAMB, OF PITTSBURGH, PENNSYLVANIA, AND ISAAC F. KINNARD, OF LYNN-FIELD, MASSACHUSETTS, ASSIGNORS TO GENERAL ELECTRIC COMPANY, A CORPORATION OF NEW YORK

COMMUTATOR-TYPE DIRECT-CURRENT WATTHOUR METER

Application filed May 3, 1929. Serial No. 360,202.

Our invention relates to the commutator type of direct current watthour meters and its primary object is to improve the operating characteristics and to reduce the size and cost of this type of meter.

The usual commutator type of direct current watthour meter is provided with a stationary field coil or coils and a rotating armature provided with a commutated winding, the latter being located in a magnetic field the circuit of which is wholly in air. In general it has not been considered feasible to use a magnetic circuit consisting in part of a ferro-magnetic material in such meters on account of the permanent magnetic effects which would be caused by short circuit currents or heavy current surges and also because of the difference in registration with increasing and decreasing meter load. The reason for this and one expedient for overcoming the difficulty where a magnetic circuit is employed is explained in United States Patent 1,276,925, Inglefield, August 27, 1918. Another reason for not using a magnetic core armature is because of the desire to keep the rotating element as light as possible. Owing to the absence of ferro-magnetic material in the magnetic circuit in the usual commutator type of direct current watthour meters it is necessary to provide a large number of ampere turns in the stationary field coil or coils in order to obtain the required operating flux through the armature.

We have discovered that by using ferromagnetic materials of low hysteresis in the field and armature of such meters, marked improvements are obtained without encountering the difficulties mentioned above.

In carrying our invention into effect we provide for the meter a magnetic circuit which is partly made up of a low hysteresis, ferro-magnetic material in what may be termed a skeleton form which includes a ferro-magnetic core armature. The effective air gap of such a magnetic circuit is small, the total reluctance of the circuit is reduced and as a result the field ampere turns necessary to produce the required operating flux of the meter are very materially reduced in comparison to a meter with a magnetic circuit wholly in air. The size and cost of the meter are likewise substantially reduced. The reduced number of ampere turns of the field winding and the skeleton form of the magnetic circuit employed result in low operating temperatures permitting heavy overloads. The skeleton form of magnetic circuit employed also provides a desirable shielding of the meter from the disturbances of stray fields.

The improved meter is also provided with a permanent magnet damping device and the light load adjustment is accomplished by allowing an adjustable portion of the stray flux from the damping magnets to pass through the meter armature in a direction to produce positive torque.

The features of our invention which are believed to be novel and patentable will be pointed out in the claims appended hereto. For a better understanding of our invention reference is made in the following description to the accompanying drawing where we have represented a perspective view of the essential elements of our improved meter in its preferred form.

Referring to the drawing, the rotating element or armature comprises potential coils 10 wound on a light shell 11 mounted on the shaft 12. The shell 11 is partially broken away in the illustration to expose to a better advantage the interior arrangement. The coils 10 are connected to the commutator 13 and brushes 14 resting on the commutator serve to connect the armature winding across the circuit to be metered. The shaft 12 carries the usual damping disc 15 which cooperates with the stationary permanent magnets 16.

The armature is provided in its interior with a ferro-magnetic core comprising circular spaced plates 17 of a ferro-magnetic material having low hysteresis. It will be apparent that the slight increase in weight of the rotating element occasioned by the magnetic discs 17 is of no consequence.

18 represents the stationary field coils which are connected in series relation with the circuit to be metered. These coils are mounted on the pole pieces of the magnetic circuit comprising spaced plates 19 composed of a ferro-magnetic material having low hysteresis. These plates extend around the armature and complete the magnetic circuit between the stationary pole pieces. At the ends of the stationary magnetic circuit thus formed the plates are spaced apart and supported by non-magnetic spacers 20 as represented. In the drawing three spaced magnetic plates 17 and 19 are represented but the invention is not limited in this respect. Two such systems of plates make a very satisfactory meter in the stationary field and the rotating armature respectively and it will be noted that the plates in the field and armature are in alinement so that a low reluctance magnetic circuit having a small effective length of air gap is established through and around the armature. Thus the field flux will pass through the armature in one direction and return around the armature. Owing to the low reluctance magnetic circuit the ampere turns of the field coils are materially less than would be the case if the magnetic circuit was wholly in air or if there were no magnetic circuit through the armature. The skeleton form of magnetic circuit employed serves as a cooling arrangement for the field as well as an effective magnetic screen for shielding the meter from the disturbances of stray fields. Such a meter may be subjected to heavy overloads without appreciable change in registration, accuracy or danger of injury to the windings.

The ferro-magnetic material used in the field and armature is one having low hysteresis, substantially lower than that of iron. This is essential in order that the flux through the armature winding shall always be proportional to the meter load regardless of increasing or decreasing load. If the material had an appreciable hysteresis loss such as is found in magnetic iron and steel the meter would run slow on an increasing load and fast on a decreasing load.

While we do not wish to limit our invention to the use of any particular magnetic material in the magnetic circuit of the meter, we have found that the nickel-iron alloys have the desired low hysteresis suitable for this purpose, particularly those nickel-iron alloys wherein the nickel content lies between 35% and 70%. The materials described in United States Patents 1,586,883 and 1,586,884, June 1, 1926, to Elmen, are suitable. Certain of the alloys described in the article entitled "Magnetic alloys named and defined" found on page 534 of the Iron Age, February 23, 1928, have the desired low hysteresis loss that makes them suitable for use in our invention. Another desirable property which is present in the nickel-iron alloys is that of high permeability.

The amount of magnetic material used should be sufficient to remain below saturation for the highest meter load contemplated. The meter represented in the drawing shows proportions which are desirable in an ordinary house type direct current watthour meter where permalloy is employed in the magnetic circuit.

While we have represented three parallel plates in the magnetic circuit, a different number may be found desirable in some instances, for example, only one plate may be sufficient in some cases. In some cases it may be desirable to make part of the plates of one material and the remainder of the plates of a different material.

Notwithstanding the fact that this meter is superior to other forms of commutating type direct-current watthour meters now on the market it is appreciably smaller in size and lower in cost.

The integrating watthour meter requires what is known as a light load adjustment or a very small constant auxiliary torque to compensate for friction and a novel feature of my invention consists in utilizing the stray field produced by the permanent damping magnets 16 for this purpose. It will be noted that the upper north and south poles of the permanent magnets 16 are positioned and located with respect to the north and south poles of the meter so that any stray flux from the permanent magnets passing through the meter armature 17 will be in the same direction as the unidirectional flux produced by the coils 18. In other words, the stray fluxes from the permanent magnets will produce a positive meter torque. Between the permanent magnets and the meter armature we have provided a magnetic screen 21 of a low hysteresis, ferro-magnetic material the position of which may be adjusted up and down as well as horizontally. By adjusting this screen the amount of stray flux from the permanent magnets which passes through the meter armature may be accurately adjusted to the correct amount to provide the desired constant light load adjustment torque.

In accordance with the provisions of the patent statutes we have described the principle of operation of our invention, together with the apparatus which we now consider to represent the best embodiment thereof; but we desire to have it understood that the apparatus shown and described is only illustrative and that the invention may be carried out by other means without departing from our invention.

What we claim as new and desire to secure by Letters Patent of the United States, is,—

1. A direct current watthour meter comprising a stationary magnetic structure provided with inwardly projecting pole pieces with field coils wound thereon, and a rotating armature member having a magnetic core with a commutated winding thereon, said armature being located between the pole pieces of the field structure, the material of the stationary magnetic structure and armature core having an appreciably lower hysteresis loss than iron whereby the flux produced by the field coils in said armature is substantially proportional to the exciting current with increasing and decreasing excitation.

2. A direct current watthour meter comprising a stationary field magnetic structure provided with inwardly projecting pole pieces, a rotating armature member having a magnetic core located between said pole pieces, a commutated voltage winding on said armature member, a current winding on said stationary magnetic structure for producing a flux through said armature, the magnetic material of said stationary structure and armature core comprising plates spaced apart in parallel planes with plates in the armature and field in the same planes, said plates being made of magnetic material having an appreciably lower hysteresis loss than iron.

3. A watthour meter of the direct current commutator type having a stationary field structure and rotating armature both containing magnetic material which, except for narrow air gaps between the field structure and armature, forms a closed magnetic circuit for the meter fluxes, said material comprising a nickel-iron alloy having an appreciably lower hysteresis loss than iron.

4. A stationary field structure for direct current watthour meters of the rotating commutated armature type, comprising a skeleton magnetic structure comprising spaced apart parallel plates formed of a nickel-iron alloy having an appreciably lower hysteresis loss than iron, said plates having inwardly projecting pole pieces, and a field winding wound about all of said plates.

5. An armature member for direct current watthour meters of the stationary field type, comprising a shaft, discs of magnetic material made of a nickel-iron alloy having an appreciably lower hysteresis loss than iron spaced apart in parallel planes on said shaft, a substantially spherical support for an armature winding surrounding said discs, a winding on said support, said discs forming a magnetic path through the center of said winding at right angles to the shaft, and a commutator on said shaft connected to said winding.

6. A direct current watthour meter comprising a rotary shaft, a commutated armature winding supported by said shaft, a damping disc spaced from said winding on said shaft, a stationary permanent magnet system for producing a damping flux through said disc, a stationary field winding for producing a unidirectional flux through said armature winding, the permanent magnet system being so located with respect to said stationary field that leakage flux from said permanent magnet system passes through said armature winding in the same direction as the flux from said stationary field, such leakage flux being proportioned to supply the light load compensating torque of said meter.

7. A meter of the integrating type having a rotational armature, a stationary field member for producing a unidirectional flux through the armature to supply the meter torque, a stationary permanent magnetic damping system for said meter so situated with respect to said stationary field member as to cause leakage flux from the permanent magnet system to pass through the armature in the same direction as the flux produced by the stationary field member, and means for controlling the magnitude of such leakage flux to supply the light load compensating torque of said meter.

8. An integrating meter comprising a shaft, an armature winding on said shaft, a stationary field structure for producing a unidirectional flux through said armature to furnish the meter torque, a damping disc on said shaft spaced apart from the armature winding, a permanent magnet system for producing a damping flux through said disc, said permanent magnet system being so located with respect to the stationary field structure as to produce a leakage flux through the armature in the same direction as that produced by the stationary field structure, such leakage flux being utilized to produce the light load compensating torque of the meter, and an adjustable flux screen between the armature and permanent magnet system for controlling the magnitude of the light load compensating torque thus produced.

In witness whereof, GEORGE LAMB has hereunto set his hand this 1st day of May, 1929, and ISAAC F. KINNARD has hereunto set his hand this 24th day of April, 1929.

GEORGE LAMB.
ISAAC F. KINNARD.